United States Patent [19]

Ishikawa et al.

[11] Patent Number: 5,909,652
[45] Date of Patent: *Jun. 1, 1999

[54] RADIO COMMUNICATION SYSTEM AND RADIO COMMUNICATION TERMINAL

[75] Inventors: Hiroyuki Ishikawa, Tachikawa; Takao Uchikura, Ome; Katsumi Muroi, Tokyo, all of Japan

[73] Assignee: Casio Computer Co., Ltd., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/632,905

[22] Filed: Apr. 16, 1996

[30] Foreign Application Priority Data

Apr. 18, 1995 [JP] Japan .................... 7-116419

[51] Int. Cl.[6] ................................ H04B 1/38
[52] U.S. Cl. ................ 455/558; 455/517; 455/88
[58] Field of Search ................. 455/517, 550, 455/552, 558, 88, 575, 418, 557, 186.1, 551

[56] References Cited

U.S. PATENT DOCUMENTS

| | | | |
|---|---|---|---|
| 5,020,105 | 5/1991 | Rosen et al. | 380/23 |
| 5,212,809 | 5/1993 | Oka | 455/54.1 |
| 5,418,837 | 5/1995 | Johansson et al. | 379/58 |
| 5,497,411 | 3/1996 | Pellerin | 379/59 |
| 5,511,232 | 4/1996 | O'Dea et al. | 455/54.1 |
| 5,640,680 | 6/1997 | Ishida et al. | 455/34.1 |
| 5,675,628 | 10/1997 | Hokkanen | 379/58 |

FOREIGN PATENT DOCUMENTS

| | | |
|---|---|---|
| 0048868 A1 | 4/1982 | European Pat. Off. . |
| 62-274972 | 11/1987 | Japan . |
| 63-73348 | 4/1988 | Japan . |
| WO 90/04833 | 5/1990 | WIPO . |
| WO 91/12698 | 8/1991 | WIPO . |

*Primary Examiner*—Reinhard J. Eisenzopf
*Assistant Examiner*—Darnell R. Armstrong
*Attorney, Agent, or Firm*—Frishauf, Holtz, Goodman, Langer & Chick

[57] ABSTRACT

In a first PHS terminal, a system calling code for identifying a system in which the first PHS terminal is registered and a slave ID number for discriminating the first PHS terminal are stored in advance in an ID chip. While a user is out, he or she sets the ID chip in a second PHS terminal which does not have the same system calling code as that of the first PHS terminal. When the user performs an operation for peer-to-peer communication on the first PHS terminal, the second PHS terminal is called using a controlling physical slot. The second PHS terminal is informed that it is called by discriminating a system calling code and a PS calling number of the physical slot on the basis of the system calling code of the ID chip, and then transmits a response signal to the first PHS terminal based on the system calling code and PS calling number of the ID chip. Thus, peer-to-peer communication can be performed even between radio communication terminals which do not have the same system calling code.

33 Claims, 9 Drawing Sheets

SIGNAL SERIES OF CONNECTOR

RESET--- RESET SIGNAL FOR CPU IN ID CHIP
SIO ----- BIDICRECTIONAL DATA SIGNAL(SERIAL IO)
CLOCK --- CLOCK SIGNAL FOR CPU IN ID CHIP
VCC ----- POWER SUPPLY
GND -- GROUND

RADIO COMMUNICATION SYSTEM AND RADIO COMMUNICATION TERMINAL

BACKGROUND OF THE INVENTION

1. Field of the Invention

The present invention relates to a radio communication system and a radio communication terminal for performing a radio communication between radio communication terminals having system codes.

2. Description of the Related Art

A radio communication system has recently been known to the public, which includes a radio communication terminal carried by a user, such as a portable telephone, a PHS (personal handy-phone system) terminal, a pager, and a PDA (personal digital assistant), for intercommunicating sound and data with another terminal including a commonly-used domestic telephone, and a base station connected to a communication network and communicating with the radio communication terminal to connect the terminal to the network.

In this system, the radio communication terminal is driven by a secondary battery or the like such that it can be carried by a user. The radio communication terminal is capable of storing various types of data items such as callee's telephone numbers and addresses, schedule, and memorandum using characters and sound, and is also capable of transmitting/receiving information (sound, sound data, text data, image data, etc.) to/from another terminal through a telephone network.

As one example of the radio communication system, there is a PHS which is currently put to practical use in Japan. The PHS will now be described for understanding of the radio communication system.

A radio communication terminal of the PHS is employed as a slave of a master (base station) placed in a home. When the terminal is operated outdoors, it is also connected to a communication network through base stations (public and self-supporting stations) connected to the telephone network, with the result that it is allowed to intercommunicate with another terminal. If, furthermore, radio communication terminals are registered as slaves of their common master, peer-to-peer radio communication can be performed between the terminals but not through the base stations.

In the peer-to-peer communication between the radio communication terminals, since the terminals necessitate a system code of their common master, all the terminals have to be brought to the master side for previous registration setting up the relation between the master and slave. In this registration, the slave ID numbers for discriminating the terminals are registered in the master, while a system calling code (part of CS-ID) for discriminating the master is registered in the slaves. In peer-to-peer radio communication between terminals, the system calling code and slave ID numbers are transmitted between the terminals, and it is determined based on the system calling code whether the peer-to-peer radio communication is possible or not. In other words, the peer-to-peer communication cannot be performed unless the system calling codes of the slaves are identical with that of the master.

The above-described radio communication terminals have the following problem. In order to perform the peer-to-peer radio communication between the terminals, all the terminals have to be brought close to their common master and registered so as to correspond to the master. Therefore, the peer-to-peer radio communication cannot be done between a terminal and another terminal which is not registered in the master of the former one or between terminals which are registered in different masters.

SUMMARY OF THE INVENTION

Accordingly, it is an object of the present invention to provide a radio communication system and a radio communication terminal capable of peer-to-peer communication between a radio communication terminal and another terminal which is not registered in the master of the former terminal.

According to the present invention, there is provided a system connected to a communication network and having a system identification information, which comprises a storing medium, a first radio communication terminal having the same system identification information as the system and arranged for receiving the storing medium, and a second radio communication terminal arranged for receiving the storing medium, and in which the first radio communication terminal, when the storing medium is installed therein, copies the system identification information onto the storing medium, and the second radio communication terminal is allowed to communicate in peer-to-peer mode by a radio wave with the first communication terminal, when the storing medium on which the system identification information of the system is copied installed thereon.

According to the present invention, there is provided another system connected to a communication network and having a system identification information, which comprises a storing medium having the system identification information, a first radio communication terminal having the same system identification information as the system and arranged for receiving the storing medium, and a second radio communication terminal arranged for receiving the storing medium, and in which a second radio communication terminal, when a detachable storing medium is set thereto, copies the system identification information of the storing medium into an internal memory of the second radio communication terminal, and is allowed to communicate in peer-to-peer mode by a radio wave with a first radio communication terminal based on the system identification information copied in the internal memory of the second radio communication terminal.

According to the present invention, there is provided a still another system which comprises a storing medium, a first radio communication terminal having a same system identification information as the system and arranged for receiving the storing medium, and a second radio communication terminal arranged for receiving the storing medium, and in which the first radio communication terminal, when the storing medium is installed therein, copies the system identification information onto the storing medium, and the second radio communication terminal is allowed to communicate in peer-to-peer mode by a radio wave with the first communication terminal, when the storing medium on which the system identification information of the system is copied installed thereon.

According to the present invention, there is provided a further system which comprises a storing medium having the system identification information, a first radio communication terminal having the same system identification information as the system and arranged for receiving the storing medium, and a second radio communication terminal arranged for receiving the storing medium, and in which the second radio communication terminal, when a detachable storing medium is set thereto, copies the system identification information of the storing medium into an internal memory of the second radio communication terminal, and is allowed to communicate in peer-to-peer mode by a radio wave with the first radio communication terminal based on the system identification information copied in the internal memory of the second radio communication terminal.

According to the present invention, there is provided a further a system having a system identification information and connected to a communication network, terminal having the same system identification information as the system for communicating in a peer-to-peer mode with another radio communication terminal having the same system identification information. The radio communication terminal comprises a storing medium adapted to be detachably installed in the radio communication terminal, instruction means for outputting an instruction, and writing means for upon receipt of the instruction from the instruction means writing the system identification information of the radio communication terminal on the storing medium is installed on the radio communication terminal.

According to the present invention, there is provided a further system connected to a communication network including a radio communication terminal having an original system identification information, for communicating in peer-to-peer mode with another radio communication terminal. The radio communication terminal comprises a storing medium adapted to be detachably installed in the radio communication terminal, for storing a system identification information, selecting means for, when the storing medium having a system identification information stored thereon is installed into the radio communication terminal, selecting any one of the original system identification information and the system identification information stored on the storing medium, and communication mean for communicating with another radio communication terminal based on the system identification information selected by the selecting means.

According to the present invention, there is provided a further system having an original system identification information and connected to a communication network including a radio communication terminal for communicating in peer-to-peer mode with another radio communication. The radio communication terminal comprises first storing medium adapted to be detachably installed on the radio communication terminal, for storing a system identification information, a first internal memory for storing a system identification information, writing means for, when the storing medium is installed on the radio communication terminal, writing the system identification information stored in the first storing medium on the first internal memory, and communication means for communicating with another radio communication terminal based on the system identification information written on the internal memory by the writing means.

According to the present invention, there is provided a further radio communication terminal having a system identification information as a system for communicating in a peer-to-peer mode with another radio communication terminal having the system identification information. The radio communication terminal comprises a storing medium adapted to be detachably installed in the radio communication terminal, instruction means for outputting an instruction, and writing means for upon receipt of the instruction from the instruction means writing the system identification information of the radio communication terminal on the storing medium is installed on the radio communication terminal.

According to the present invention, there is provided a further radio communication terminal having an original system identification information, for communicating in peer-to-peer mode with another radio communication terminal, the radio communication terminal comprising a storing medium adapted to be detachably installed in the radio communication terminal, for storing a system identification information, selecting means for, when the storing medium having a system identification information stored thereon is installed into the radio communication terminal, selecting any one of the original system identification information and the system identification information stored on the storing medium, and communication means for communicating with another radio communication terminal based on the system identification information selected by the selecting means.

According to the present invention, there is provided a further radio communication terminal for communicating in peer-to-peer mode with another radio communication, the radio communication terminal comprising first storing medium adapted to be detachably installed on the radio communication terminal, for storing a system identification information, a first internal memory for storing a system identification information, writing means for, when the storing medium is installed on the radio communication terminal, writing the system identification information stored in the first storing medium on the first internal memory, and communication means for communicating with another radio communication terminal based on the system identification information written on the internal memory by the writing means.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which.

DETAILED DESCRIPTION OF THE PREFERRED EMBODIMENTS

A preferred embodiment of a radio communication system according to the present invention will now be described with reference to the accompanying drawings. In the embodiment, the present invention is applied to a PHS terminal.

Figure 1:
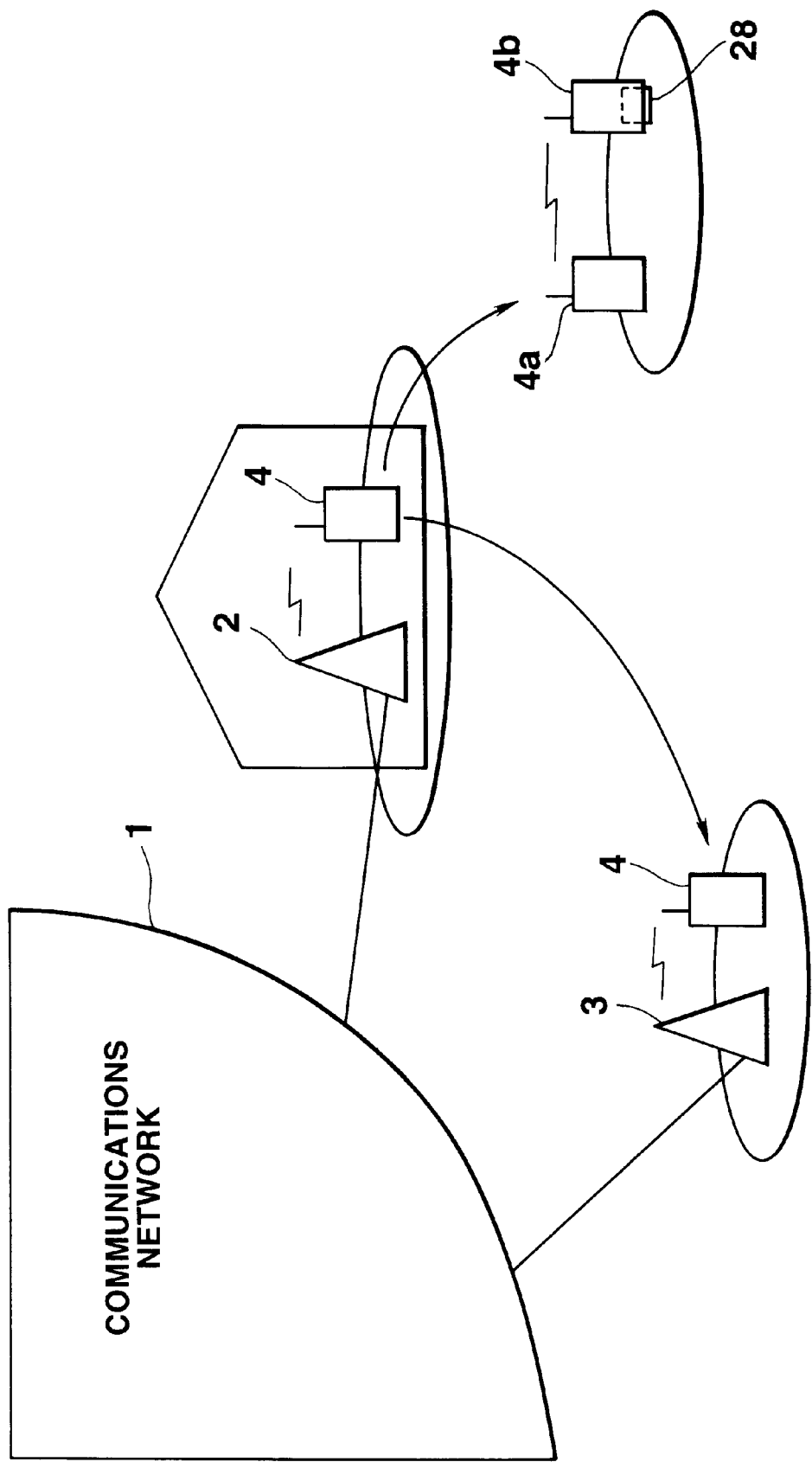
FIG. 1 is a block diagram showing a configuration of a radio communication system such as a PHS terminal, according to the present invention.

1. Configuration of Radio Communication System:

FIG. 1 is a block diagram showing a configuration of a PHS system. The configuration of the PHS system is common to the first and second embodiments. In FIG. 1, reference numeral 1 indicates a nationwide normal analog telephone network or a dedicated digital network, which are generically called a communication network. A master (base station) 2 is connected to the communication network 1 and placed in a company, a home and the like in order to connect the network 1 with a PHS terminal 4 by radio. A radio base station 3 is connected to the communication network 1 and installed outdoors, in public facilities and the like to wirelessly connect the network 1 with the PHS terminal 4 which is carried outdoors and moved to public facilities or the like.

The PHS terminal 4 is carried indoors or outdoors by a user, and makes a request to the master 2 or base station 3 for line connection by radio to communicate with another base station or another PHS terminal. As shown in FIG. 1, a PHS terminal 4a registered as a slave of the master 2 is allowed to directly communicate (peer-to-peer communication) with a PHS terminal 4b which is not registered in the same master.

The PHS terminal 4b is provided with an ID chip 28 for storing information necessary for peer-to-peer communication between terminals, such as a system calling code for discriminating the slave when the PHS terminal 4a is registered in the master. Alternately, information necessary for peer-to-peer communication with the terminal 4a and stored in the ID chip 28 is copied into an internal memory in the terminal 4b. As a result, based on the information stored in the ID chip 28 or the information copied into the internal memory, peer-to-peer communication is performed between the PHS terminals 4a and 4b. The details of the ID chip 28 will be described later.

Figure 2:
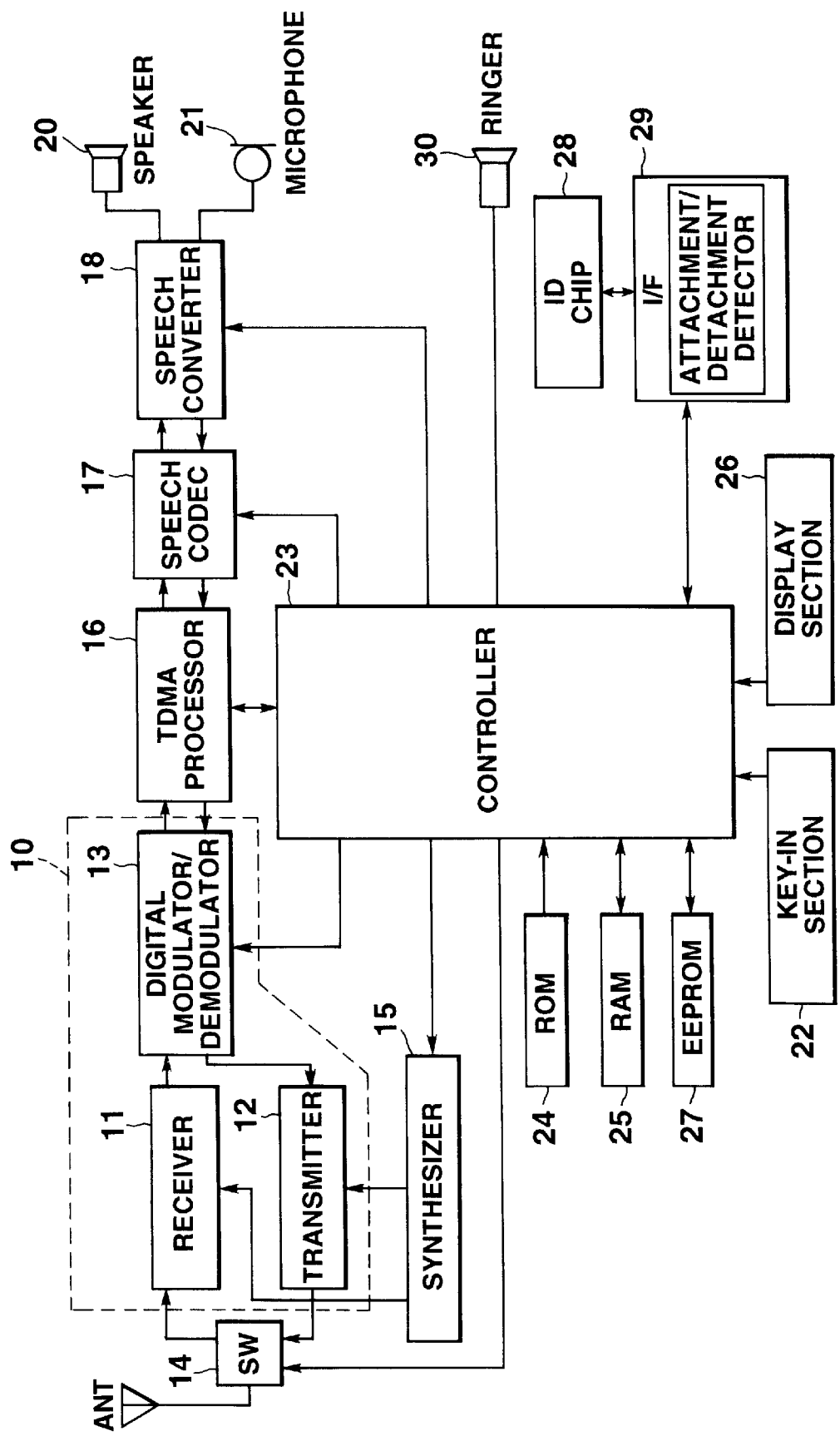
FIG. 2 is a block diagram showing a configuration of a PHS terminal of the system according to the embodiment of the present invention.

2. Configuration of PHS Terminal:

FIG. 2 is a block diagram showing a configuration of the PHS terminal 4 described above. In FIG. 2, a transmitting/receiving section 10 includes a frequency converter having both a receiver 11 and a transmitter 12 and a modem (digital modulator/demodulator) 13 having a transmitting/receiving function.

The receiver 11 mixes a signal, which is received by an antenna ANT and supplied through an antenna switch 14, with a local oscillation signal having a predetermined frequency output from a PLL synthesizer 15, to convert the received signal into an IF (intermediate frequency) signal whose frequency ranges from 1.9 GHz to about 1 MHz.

The transmitter 12 mixes a modulated signal of $\pi/4$-shifted QPSK (quadrature phase shift keying), which is supplied from the modem 13, with a local oscillation signal having a predetermined frequency output from the PLL synthesizer 15, to convert the modulated signal into a signal having a frequency of 1.9 GHz and sends out the signal from the antenna ANT via the antenna switch 14.

In the receiver of the modem 13, the IF signal from the receiver 11 of the frequency converter is demodulated, the demodulated signal is divided into series of data items I and Q, and they are transmitted to a TDMA (Time Division Multiple Access) processor 16. In the transmitter of the modem 13, I and Q data are generated from data supplied from the TDMA processor 16 and modulated by $\pi/4$ shift QPSK, and the modulated data is supplied to the transmitter 12 of the frequency converter.

The TDMA processor 16 time-divides a radio frequency signal to execute TDMA processing for transmitting/receiving a signal in a burst way in a specific time zone. More specifically, on the reception side of the TDMA processor 16, data for one slot is taken out of the data supplied from the modem 13 in predetermined timing, and a unique word (sync signal) is extracted from the data to generate a frame sync signal. Then, a scramble of control data and sound data sections is canceled, and control and sound data is obtained from the format of the slot. Control data is sent to a controller 23 and sound data is transmitted to a speech CODEC (Coder/Decoder) 17. On the transmission side of the processor 16, the control data is added to the sound data transmitted from the speech CODEC 17 to generate transmission data. The scramble is added to the transmission data and then the unique word is added thereto to prepare transmission data for one slot. The transmission data is transmitted to the modem 13 in a predetermined timing or through a slot assigned thereto.

The TDMA processor 16 is so operated that the signals transmitted from the master (base station) or slave (radio communication terminal, PHS terminal) do not collide at the same frequency in order to make them intercommunicate with each other. Each base station sends a signal to a time slot assigned in a frame and performs time position control (burst synchronization control) to prevent the signal from colliding with another signal.

The foregoing speech CODEC 17 is designed to compress/extend digital data and constituted of a receiver section and a transmitter section. The receiver section extends an ADPCM sound signal (4 bits×8 KHz=32 Kbps), which is supplied from the TDMA processor 16, by decoding the ADPCM sound signal into a PCM sound signal (8 bits×8 KHz=64 Kbps), and sends the extended signal to a speech conversion circuit 18. The transmitter section compresses the PCM sound signal, which is supplied from the speech conversion circuit 18, by encoding the PCM sound signal into an ADPCM sound signal, and sends the compressed signal to the TDMA processor 16.

The speech conversion circuit 18 is designed to convert an analog signal to a digital one, and vice versa. A receiver section of the circuit 18 converts a PCM sound signal supplied from the speech CODEC 17, into an analog sound signal to make a sound from a speaker 20, while a transmitter section thereof converts an analog sound signal supplied from a microphone 21, into a PCM signal and transmits it to the speech CODEC 17. The speaker 20 and microphone 21 constitute a handset by connecting their handles to each other.

A key-in section 22 includes numeral keys for inputting callee's telephone numbers, switches for on-hook and off-hook modes, and a volume switch for varying a sound level. The conditions of the keys and switches are supplied to the controller 23. The controller 23 then controls the entire system in accordance with a predetermined program.

A ROM 24 stores programs executed by the controller 23, various parameters such as CS-ID previously written by a communication service provider and the like, and a RAM 25 stores data generated according to a control operation of the controller 23 and serves as a work area. The data stored in the RAM 25 is maintained by a power supply such as a secondary battery (not shown).

A display section 26 includes an LCD for displaying various types of data items such as operation modes, telephone numbers and call time, service menus offered by service companies, and the like, and an LED for showing ON and OFF states of a switch. The display section 26 is constituted of a touch panel in which the data items are displayed. If a user indicates (depresses) an icon or the like using or not using a touch pen (not shown), a function corresponding to the icon is performed.

An EEPROM 27 stores a password for confirming whether the PHS terminal is used by a genuine user. In a second embodiment, the information necessary for peer-to-peer communication and stored in the ID chip 28 is stored in the EEPROM 27, as described later. The password is input by a user in starting to use or operate the PHS terminal. The input password is compared with the password stored in the EEPROM 27. If they are identical with each other, it is determined that the user is a genuine one.

In order to discriminate between the master CS-ID (described later) and PHS terminal, a slave ID number and the like are stored in an ID chip 28, which is detachable from the PHS terminal. The details of the ID chip 28 will be described later.

An interface 29 is provided to receive/transmit data from/to the ID chip 28, and includes an attachment/detachment detector for detecting that the ID chip 28 is attached to the PHS terminal. A result detected by the detector is supplied to the controller 23. A ringer 30 rings to inform a user of the received call or the like.

Figure 3:
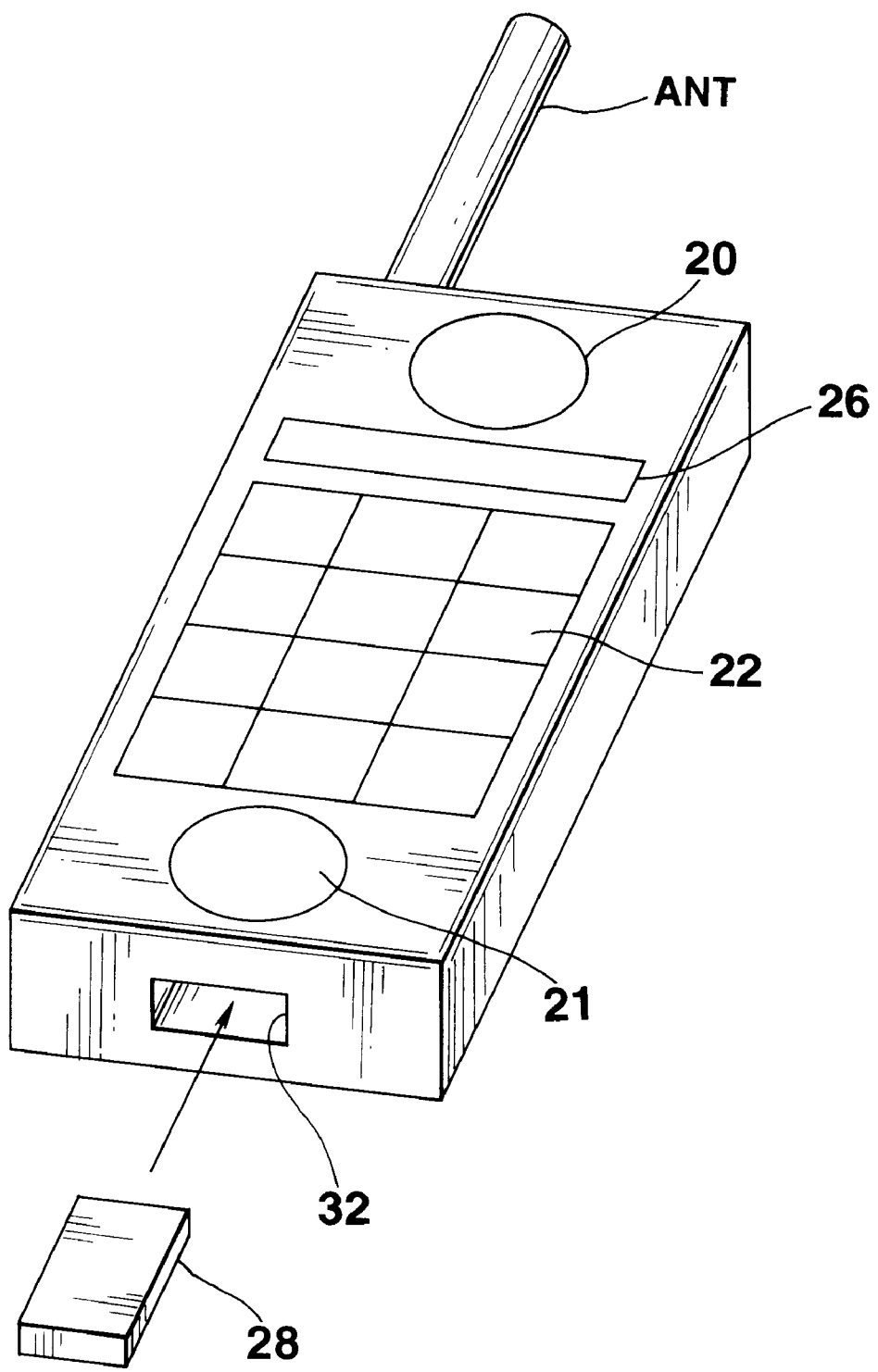
FIG. 3 is a perspective view of the outward appearance of the PHS terminal of the system according to the embodiment of the present invention.

3. Outward Appearance of PHS:

FIG. 3 is a perspective view schematically showing the outward appearance of the PHS terminal 4 described above. In FIG. 3, the same structural elements as those of FIG. 2 are denoted by the same reference numerals and their descriptions are omitted.

Referring to FIG. 3, the speaker 20, display section 26, key-in section 22, and microphone 21 are provided on one face of the housing of the PHS terminal 4. A slot 32 into which the ID chip 28 is inserted is formed in the bottom portion of the housing. One end of the ID chip 28, which contacts the innermost of the slot, is provided with a terminal (not shown) fitted into the attachment/detachment detector of the interface 29. As described above, the detachable ID chip 28 can be attached to another PHS terminal 4, too.

Figure 4:
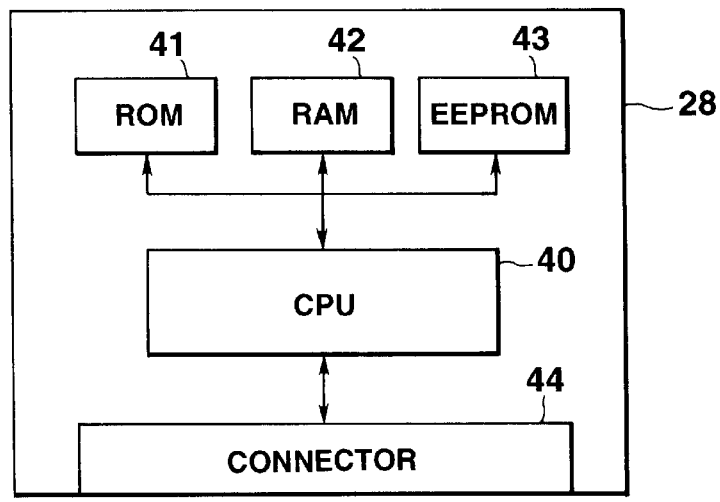
FIG. 4 is a block diagram showing a configuration of an ID chip in the system according to the embodiment of the present invention.

4. Configuration of ID Chip:

FIG. 4 is a block diagram showing a configuration of the ID chip 28 described above. As shown in FIG. 4, the ID chip 28 includes a CPU 40, a ROM 41, a RAM 42, an EEPROM 43 and a connector 44.

The CPU 40 executes communication control for transmitting/receiving various data items to/from the PHS terminal 4. The ROM 41 stores programs executed by the CPU 40. The RAM 42 is used as a work area when the programs are executed.

Figure 5:
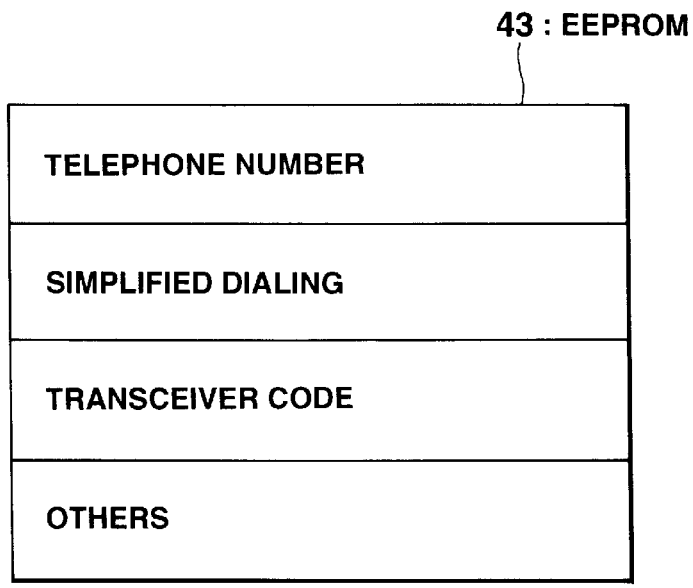
FIG. 5 is a conceptual view of data structure of EEPROM of the ID chip.

The EEPROM 43 stores data as shown in FIG. 5. In FIG. 5, "TELEPHONE NUMBER" shows an area for storing callee's numbers used in originating calls and incoming calls, "SIMPLIFIED DIALING" indicates an area for storing telephone directories and the like, "TRANSCEIVER CODE" denotes an area for storing codes for peer-to-peer communication between terminals, and "OTHERS" shows an area for storing information, such as extension numbers, call time, and charges, which is not included in the above three areas.

The connector 44 has terminals for a reset signal, an SIO (Serial I/O) signal, a clock signal, a VCC signal and a ground signal. The reset signal is for resetting the CPU 40 of the ID chip 28. The SIO signal is a two-way data signal to transmit/receive data to/from the controller 23 of the PHS terminal 4. The clock signal is supplied to the CPU 40 in the ID chip 28. The VCC is a signal line for applying a power supply voltage.

Figure 6:
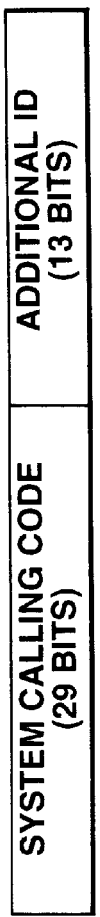
FIG. 6 is a conceptual view of data structure of CS-ID in the system according to the embodiment of the present invention.

5. Structure of CS-ID:

Each master 2 stores CS-ID for discriminating a master corresponding to the PHS terminal 4. FIG. 6 is a schematic view of the configuration of the CS-ID. The CS-ID is 42 bits in total and includes a system calling code of 29 bits and an additional ID of 13 bits. When a master 2 is registered in its slave PHS terminal 4, the CS-ID is transmitted from the master 2 to the PHS terminal 4 by a predetermined operation and stored in the internal store (EEPROM 27) of the PHS terminal 4, with the result that the master 2 and PHS terminal 4 correspond to each other and they can intercommunicate with each other accordingly. The part (system calling code) of the CS-ID stored in the PHS terminal 4 is copied in a transceiver code area of the EEPROM 43 when a predetermined operation is performed in the PHS terminal 4 into which the IC chip 28 is inserted.

Figure 7:
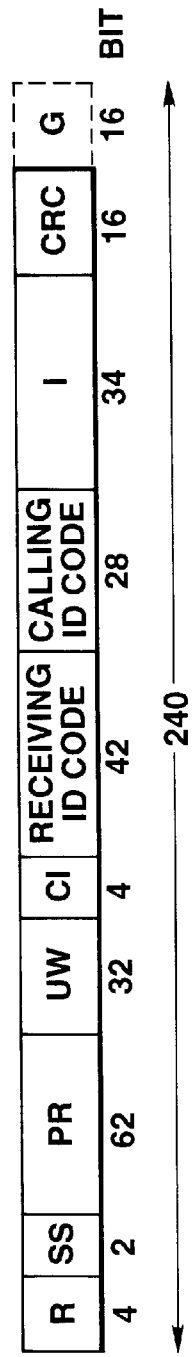
FIG. 7 is a conceptual view of data structure of controlling physical slot SCCH in the system according to the embodiment of the present invention.

6. Constitution of Controlling Physical Slot:

In the radio communication (between a base station and a terminal or between terminals) according to the above-described embodiment, the PHS terminal 4 discriminate between the transmission and reception sides by means of the controlling physical slot shown in FIG. 7.

As shown in FIG. 7, the physical slot is 240 bits in total, and includes a transition response ramp time R (4 bits), a start symbol SS (2 bits), a preamble PR (62 bits), a sync word UW (32 bits), a channel type CI (4 bits), a receiving identification code (42 bits), a calling identification code (28 bits), data I (34 bits), CRC (16 bits), and guard bits G (16 bits).

Among them, the receiving and calling identification codes are relevant to the present invention. In the radio communication between the base station and terminal, the 42-bit CS-ID as shown in FIG. 6 is written into an area of the receiving identification code, and 28-bit PS-ID for identification a terminal is written into an area of the calling identification code (FIG. 7 shows an example of an up-link channel and, in a down-link channel, 42-bit CS-ID is the calling identification code and 28-bit PS-ID is the receiving identification code).

Figure 8:
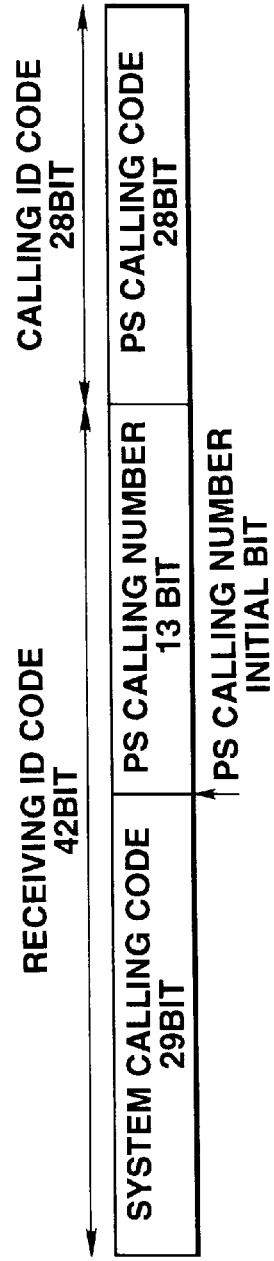
FIG. 8 is a conceptual view of data structure of part of the controlling physical slot SCCH.

In the radio communication between the terminals, as shown in FIG. 8, the receiving identification code includes a system calling code (29 bits) for identifying the master, as described above, and a PS calling number (13 bits) for identifying the PHS terminal on the called or receiving side. The calling identification code includes a PS calling code (PS-ID) for identifying the PHS terminal on the calling side. The PS calling number is a logic number which is effective only for peer-to-peer communication between slaves.

7. Operation in Embodiment:

An operation of the PHS terminal 4 according to the above embodiment will now be described.

Figure 9A:
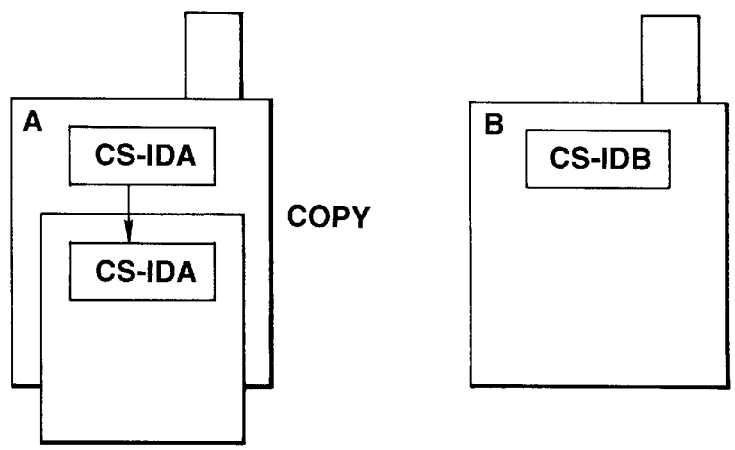
FIGS. 9A and 9B schematically illustrate a first embodiment of the present invention.
Figure 9B:
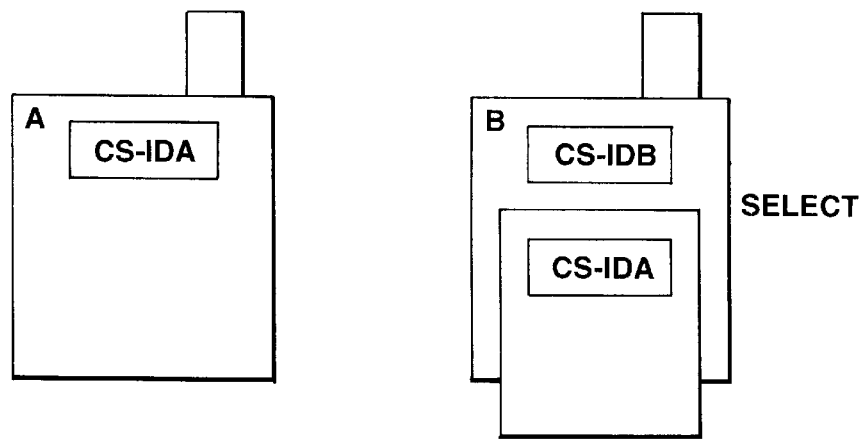

According to a first embodiment, a detachable memory is attached to a PHS terminal "A" as shown in FIG. 9A and the information necessary for the peer-to-peer communication between the PHS terminal "A" and another PHS terminal 4a, such as a system calling code (part of CS-ID) and a slave ID number (PS calling code) of the PHS terminal 4a is copied into the memory. As shown in FIG. 9B, the detachable memory into which a peer-to-peer communication information (CS-IDA) is copied is detached from the terminal "A" and attached to another PHS terminal "B". As a result, the PHS terminal "B" can communicate with the PHS terminal "A" in a peer-to-peer mode by selecting the peer-to-peer communication information stored in the detachable memory.

Figure 10A:
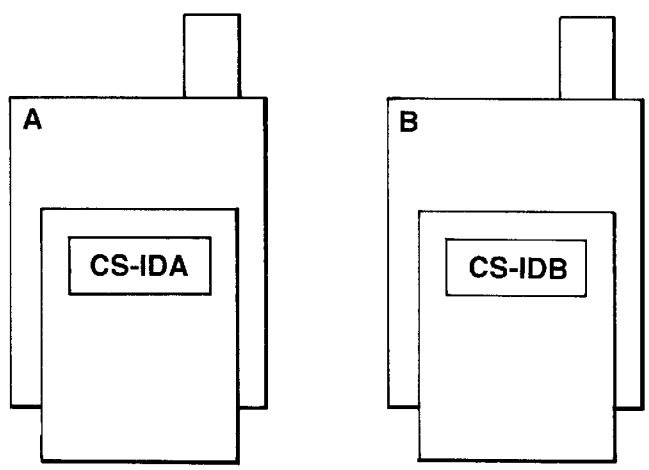
FIGS. 10A, 10B, and 10C schematically illustrate a second embodiment of the present invention.
Figure 10B:
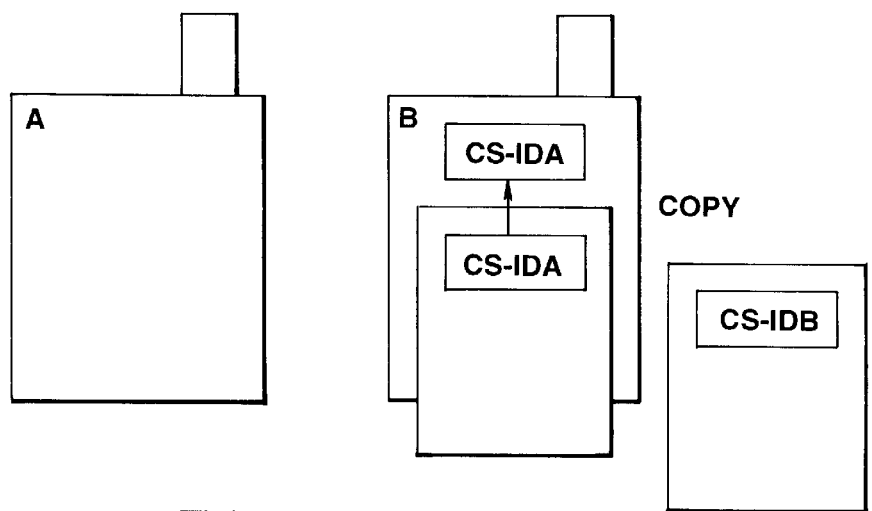
Figure 10C:
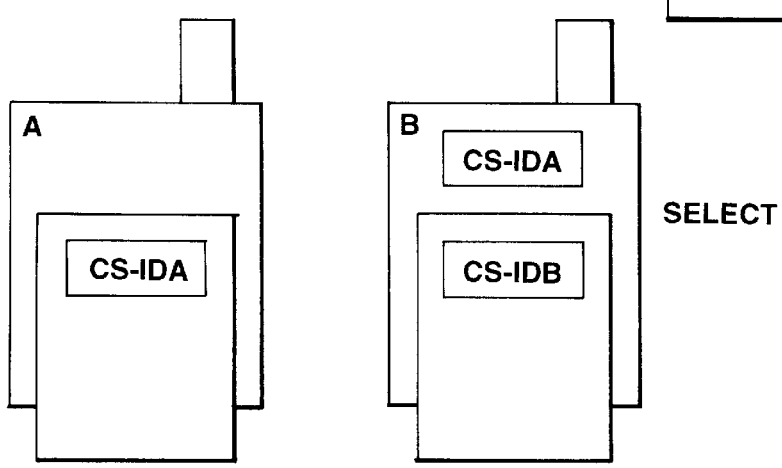

According to a second embodiment, a detachable memory storing the information necessary for the peer-to-peer communication with the PHS terminal "A", such as a system calling code (part of CS-ID) and a slave ID number (PS calling code) of the PHS terminal "A" is attached to another PHS terminal "B", as shown in FIGS. 10A and 10B. The peer-to-peer communication information (CS-IDA) is copied into an internal memory of the PHS terminal "B". As a result, the PHS terminal "B" can communicate with the PHS terminal "A" in a peer-to-peer mode by selecting the peer-to-peer communication information stored in the internal memory.

Figure 11:
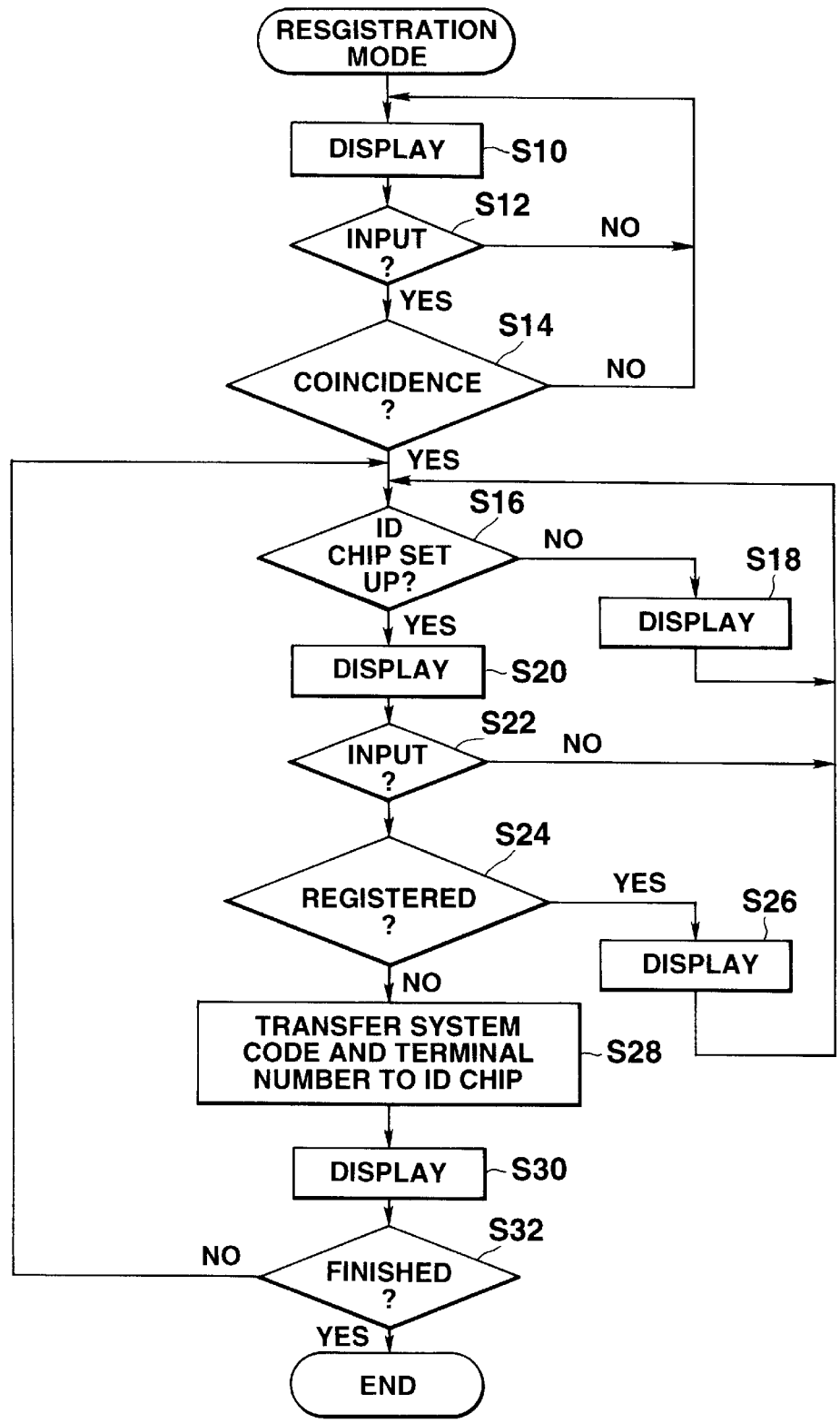
FIG. 11 is a flowchart showing a process of registering a peer-to-peer communication information in an IC chip in a system according to the first embodiment.

7-1. First Embodiment:

FIG. 11 is a flowchart showing a process of registering a system calling code (part of CS-ID) and a slave ID number (PS calling code) in the ID chip 28 from a predetermined PHS terminal.

If a registration mode is selected by the key-in section 22 of the PHS terminal 4, a message for urging an operator to input his or her password, for example, a message "PLEASE INPUT PASSWORD" is displayed on the display section 26 in step S10.

In step S12, it is determined whether the password is input or not. If no password is input, the flow returns to step S10. If the password is input, the flow advances to step S14.

In step S14, it is determined whether the input password coincides with that stored in advance in the EEPROM 27. If they do not coincide, the flow returns to step S10. After that, steps S10 to S14 are repeated until the correct password is input. If it is not input even though the steps are repeated by a given number, the registration can be finished. If both the passwords are identical with each other, the flow advances to step S16.

In step S16, it is determined whether the ID chip 28 is inserted into the PHS terminal. If NO, the flow goes to step S18.

In step S18, a message for urging the operator to set the ID chip 28, for example, a message "PLEASE SET ID CHIP" is displayed on the display section 26, and the flow returns to step S16, where the terminal waits for the operator to set the ID chip 28. If the ID chip 28 is already inserted into the terminal or it is set according to the message, the flow advances to step S20.

In step S20, a message for urging the operator to input a slave ID number, for example, a message "PLEASE INPUT SLAVE ID NUMBER" is displayed on the display section 26.

In step S22, it is determined whether the slave ID number is input or not. The slave ID number corresponds to the foregoing PS calling number and serves to call the PHS terminal on the receiving-side in peer-to-peer communication between terminals.

According to the embodiment of the present invention, the slave ID number is input by the key-in section 22, but can be assigned automatically by the base station 2 of the master. If the slave ID number is not input in step S22, the flow returns to step S16. After that, the steps S16 to S22 are repeated until the slave ID number is input. If the slave ID number is input in step S22, the flow advances to step S24.

In step S24, it is determined whether the slave ID number has been registered or not. If YES in step S24, the flow goes to step S26. In step S26, a message for informing the operator that the slave ID number has been registered, for example, a message "REGISTERED" is displayed on the display section 26. The flow returns to step S16.

If the slave ID number has not yet been registered, the flow goes from step S24 to step S28. In step S28, the system code and input slave ID number are transmitted to the ID chip 28 through the interface 29, and they are stored in the transceiver code area of the EEPROM 43.

In step S30, a message for informing the operator that input slave ID number is registered, for example, a message "SLAVE ID NUMBER N IS REGISTERED" is displayed on the display section 26. "N" indicates the actually-input slave ID number.

In step S32, it is determined whether the registration is completed or not. If NO, the flow returns to step S16. If YES, the registration ends.

As described above, the ID chip 28 set in the PHS terminal 4 (for example, 4a) stores the system code for identifying the master 2 to which the PHS terminal 4 is previously registered and the slave ID number for identifying the PHS terminal (on the receiving side).

If a user removes the ID chip 28 from the PHS terminal 4 and goes out and sets it in another PHS terminal (for example, 4b) which is not registered in the master 2, the peer-to-peer communication can be performed between the PHS terminals 4a and 4b having different system codes which are previously registered, by selecting the peer-to-peer communication information stored in the ID chip 28 of the PHS terminal 4b.

7-2. Second Embodiment:

The second embodiment will be described hereinafter. The second embodiment can be realized by slightly modifying the first embodiment so that only different portions will be described with reference to the flowchart of the first embodiment shown in FIG. 11. The description is made for an example in which the system code stored in the ID chip 28 is copied into the EEPROM 27 of the PHS terminal 4.

The ID chip 28 storing a system code of another master 2 is attached to the PHS terminal 4. If the registration mode is selected by using the key-input section 22, the flow chart shown in FIG. 11 starts.

A message for urging an operator to input his or her password is displayed on the display section 26 and it is determined whether the input password coincides with that stored in the EEPROM 27 (steps S10, S12 and S14).

When the correct password is input, it is determined whether the ID chip 28 is inserted into the PHS terminal (step S16).

If the ID chip 28 is not inserted, a message for urging the operator to set the ID chip 28, for example, a message "PLEASE SET ID CHIP" is displayed on the display section 26 (step S18).

If the ID chip 28 is already inserted into the terminal or it is set according to the message, a message for urging the operator to input a slave ID number, for example, a message "PLEASE INPUT SLAVE ID NUMBER" is displayed on the display section 26 (step S20). The flow advances step S22 and it is determined whether the slave ID number is input or not.

The slave ID number corresponds to the foregoing PS calling number and serves to call the PHS terminal on the receiving-side in peer-to-peer communication between terminals. According to the embodiment of the present invention, the slave ID number is input by the key-in section 22, but can be assigned automatically by the base station 2 of the master.

If the slave ID number is input by the user in accordance with the guidance message in step S22, it is determined whether the input slave ID number has been registered or not based on the slave ID number stored in the ID chip 28 (step S24). If YES in step S24, a message for informing the operator that the input slave ID number has been registered, for example, a message "REGISTERED" is displayed on the display section 26.

If the slave ID number has not yet been registered, the PHS terminal 4 reads out the system code and the slave ID number from the ID chip 28 and registered them into the internal EEPROM 27 (step S28). In the ID chip 28, the input slave ID number is stored in the transceiver code area of the EEPROM 43.

Then, a message for informing the operator that input slave ID number is registered, for example, a message "SLAVE ID NUMBER N IS REGISTERED" is displayed on the display section 26 (step S30). "N" indicates the actually-input slave ID number.

In step S32, it is determined whether the registration is completed or not. If YES, the registration ends.

As described above, the system code for identifying another master 2 and the slave ID number which is previously registered in the master 2, both of which are stored in the ID chip 28 are copied into the EEPROM 27 of another PHS terminal 4 (for example, 4b) which is registered in the other master. As a result, the peer-to-peer communication can be performed between the PHS terminals 4a and 4b having different system codes which are previously registered, by selecting the peer-to-peer communication information stored in the ID chip 28 of the PHS terminal 4b.

Following are examples of the operation of the peer-to-peer communication using the peer-to-peer communication information registered in the first and second embodiments.

Figure 12:
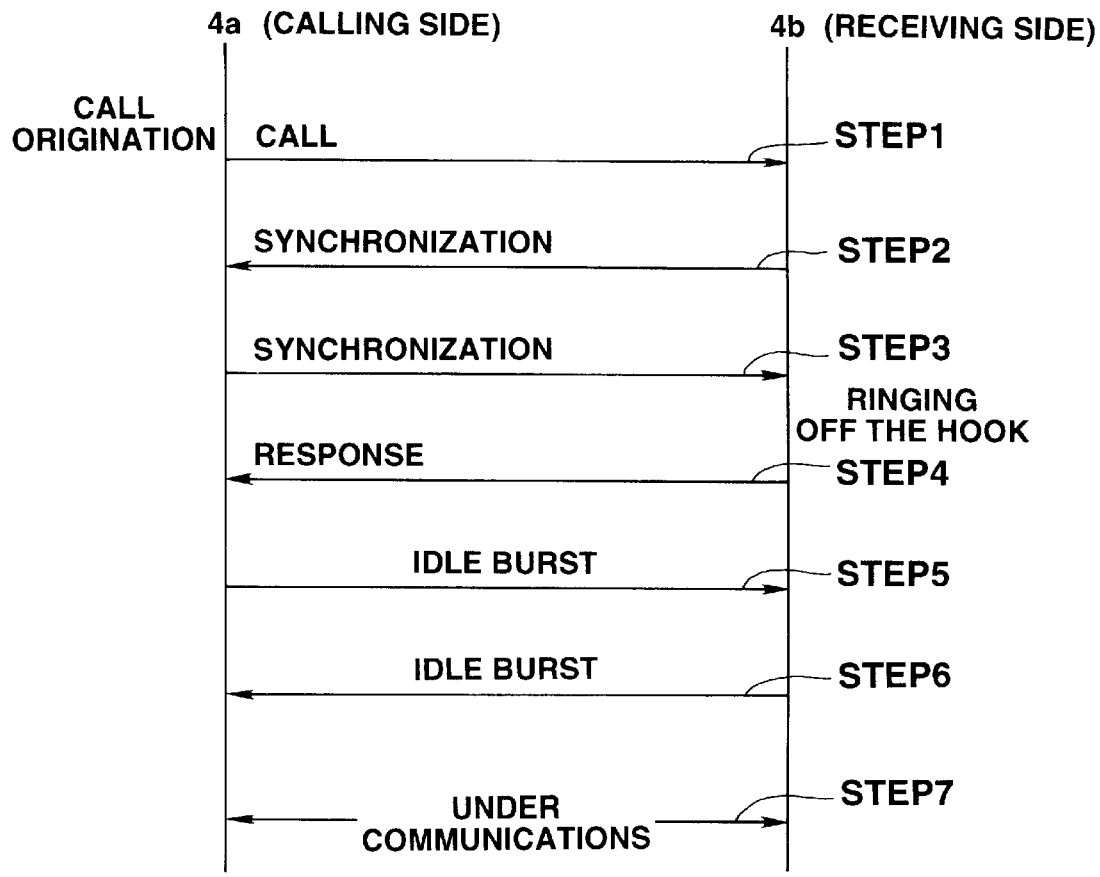
FIG. 12 is a conceptual view showing a control sequence in peer-to-peer communication between PHS terminals in the system according to the first embodiment.

7-3. Communication Processing:

FIG. 12 is a conceptual view of a control sequence in peer-to-peer communication between PHS terminals in the system according to the present invention. Since the respective components of the PHS terminals, which are related to a call, are the same as those of the commonly-used PHS terminal, their operations are omitted. In the above embodiments, the system calling code is stored in the internal ROM 24 of the terminal and the ID chip 28. It is possible to select one of the internal ROM 24 and the ID chip 28 based on a selection input from the key-in section 22 or a detection of setting the ID chip 28 to the terminal.

First, a user determines which system calling code should be used (code selected by the user or code selected by the ID chip detection) and performs an operation of making a call by key-in section 22 in the calling-side PHS terminal 4a for peer-to-peer communication between terminals. Then, as shown in FIG. 8, the system calling code (29 bits) of the CS-ID stored in the terminal, the PS calling number of the receiving-side slave ID number, and the PS calling code for discriminating the calling-side PHS terminal are combined, and the combined data (calling signal in STEP 1) is transmitted by radio through the controlling physical slot shown in FIG. 7. In the receiving-side PHS terminal 4b, the received system calling code and PS calling number of the physical slot and the system calling code and slave ID number stored in the ID chip 28 are compared, thereby recognizing that the terminal 4b is called. After that, sync words (sync signals in STEPS 2 and 3) are transmitted between the calling- and receiving-side PHS terminals 4a and 4b. In the receiving-side PHS terminal 4b, the system calling code stored in the ID chip 28, the calling-side slave ID number (PS calling number), and the receiving-side slave ID number (PS calling code) are combined, and the combined data (response signal in STEP 4) is transmitted by radio to the calling-side PHS terminal 4a through the controlling physical slot shown in FIG. 7. Thereafter, an idle burst is transmitted between the calling- and receiving-side PHS terminals 4a and 4b (STEPS 5 and 6), and peer-to-peer communication between the terminals is started (STEP 7 et seq.).

As described above, according to the foregoing embodiment, if a user goes out with the ID chip 28 and sets it in a PHS terminal registered in another master, the peer-to-peer communication can be performed between PHS terminals even though these terminals are not registered in their common master.

The maximum transmission time of the foregoing "calling signal" can be set to 10 seconds in consideration of battery saving on the receiving side. In the receiving-side PHS terminal 4b, the "sync signal" can be canceled and the "response signal" can directly be returned in automatic response. In the calling-side PHS terminal 4a, the counting of transmission time can be started when the "calling signal" is transmitted and, in the receiving-side PHS terminal 4b, it can be started when the "sync signal" is transmitted.

In the above-described embodiment, part of the CS-ID stored in the ID chip 28 cannot be used for a call between a terminal and its corresponding master 2 and, in other words, it is used only for peer-to-peer communication between terminals (transceiver communication); therefore, it need not be erased particularly. However, it can be erased automatically after a fixed period of time elapses or if a predetermined number of calls are made.

Furthermore, a plurality of system calling codes can be stored in the ROM 24, the EEPROM 27 or the ID chip 28, and one of them for use can be selected by a certain method, e.g., by operating the key-in section 22. Since, in this case, the ID chip can be applied to a plurality of masters, the PHS terminals capable of peer-to-peer communication can be increased in number.

Further, in the second embodiment of the present invention, the system calling code (e.g., CS-IDB of the communication terminal B) which is previously stored in the detachable memory (e.g., ID chip 28) can be stored in the internal memory of the radio terminal (e.g., the radio communication terminal B).

As described above, according to the present invention, a radio communication terminal has a detachable storing medium, this medium is set in an other radio communication terminal, and at least base station information necessary for peer-to-peer communication is stored in the medium, thereby obtaining the advantage that the peer-to-peer communication between the former terminal and the latter terminal, which is not registered in the master of the former terminal, can be performed.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A radio communication system comprising:
   a detachable storing medium;
   a first radio communication terminal comprising a memory for storing first system identification data used for peer-to-peer communication and means for copying the first system identification data stored in said memory to said detachable storing medium; and
   a second radio communication terminal comprising means for receiving said detachable storing medium and means for performing peer-to-peer communication with said first radio communication terminal in peer-to-peer mode by using the first system identification data stored in said detachable storing medium received by said second radio communication terminal.

2. The system according to claim 1, wherein said second radio communication terminal comprises a memory for storing second system identification data, and means for selecting the first system identification data stored in said storing medium when said storing medium is attached to said second radio communication terminal.

3. The system according to claim 1, wherein said second radio communication terminal comprises a memory for storing second system identification data, and means for selecting one of the first system identification data stored in said storing medium and the second system identification data stored in said memory of said second radio communication terminal.

4. The system according to claim 1, wherein said first radio communication terminal comprises means for enabling copying of the first system identification data from said memory of said first radio communication terminal to said storing medium only when a correct password is input.

5. A radio communication system comprising:
   a detachable storing medium for storing first system identification data used for peer-to-peer communication;
   a first radio communication terminal comprising means for receiving said detachable storing medium and means for copying the first system identification data stored in said detachable storing medium to a memory of said first radio communication terminal; and
   a second radio communication terminal comprising means for receiving said detachable storing medium and means for directly communicating with said first radio communication terminal in peer-to-peer mode by using the first system identification data stored in said detachable storing medium received by said second radio communication terminal.

6. The system according to claim 5, wherein said second radio communication terminal comprises a memory for storing second system identification data, and means for selecting the first system identification data stored in said storing medium when said storing medium is attached to said second radio communication terminal.

7. The system according to claim 5, wherein said second radio communication terminal comprises a memory for storing second system identification data, and means for selecting one of the first system identification data stored in said storing medium and the second system identification data stored in said memory of said second radio communication terminal.

8. The system according to claim 5, wherein said first radio communication terminal comprises means for enabling copying of the first system identification data from said storing medium to said memory of said first radio communication terminal only when a correct password is input.

9. A method of performing peer-to-peer mode direct radio communication between a first radio communication terminal and a second radio communication terminal, comprising;
   copying first system identification data used for peer-to-peer communication and stored in a memory of the first radio communication terminal to a detachable storing medium;
   inserting the detachable storing medium in the second radio communication terminal; and
   directly communicating said second radio communication terminal with said first radio communication terminal in peer-to-peer mode using the first system identification data which is stored in said detachable storing medium inserted in said second radio communication terminal and stored in said memory of said first radio communication terminal.

10. The method according to claim 9, wherein said second radio communication terminal comprises a memory for storing second system identification data, and said method further comprises a step of selecting the first system identification data stored in said storing medium when said storing medium is attached to said second radio communication terminal.

11. The method according to claim 9, wherein said second radio communication terminal comprises a memory for storing second system identification data, and said method further comprises a step of selecting one of the first system identification data stored in said storing medium and the second system identification data stored in said memory of said second radio communication terminal.

12. The method according to claim 9, further comprising a step of enabling copying of the first system identification data from said memory of said first radio communication terminal to said storing medium only when a correct password is input.

13. A method of performing peer-to-peer mode direct radio communication between a first radio communication terminal and a second radio communication terminal, comprising:
   inserting a detachable storing medium which has stored therein first system identification data used for peer-to-peer communication into the first radio communication terminal;
   copying the first system identification data stored in said detachable storing medium to a memory of said first radio communication terminal;
   removing the detachable storing medium from said first radio communication terminal;
   inserting the detachable storing medium in the second radio communication terminal; and
   directly communicating said second radio communication terminal with said first radio communication terminal in peer-to-peer mode using the first system identification data which is stored in said detachable storing medium inserted in said second radio communication terminal and copied into said memory of said first radio communication terminal.

14. The method according to claim 13, wherein said second radio communication terminal comprises a memory for storing second system identification data, and said method further comprises a step of selecting the first system identification data stored in said storing medium when said storing medium is attached to said second radio communication terminal.

15. The method according to claim 13, wherein said second radio communication terminal comprises a memory for storing second system identification data, and wherein said method further comprises a step of selecting one of the first system identification data stored in said storing medium and the second system identification data stored in said memory of said second radio communication terminal.

16. The method according to claim 13, further comprising a step of enabling copying of the first system identification data from said storing medium to said memory of said first radio communication terminal only when a correct password is input.

17. A radio communication terminal for use in a radio communication system, said radio communication terminal comprising:
   a memory for storing system identification data used for peer-to-peer communication;
   means for receiving a detachable storing medium;
   means for copying the system identification data stored in the memory to said detachable storing medium; and
   means for directly communicating with another radio communication terminal in peer-to-peer mode by using the system identification data stored in said memory and said detachable storing medium received by the other radio communication terminal.

18. The radio communication terminal according to claim 17, further comprising:
   means for inputting a password;
   comparing means for comparing the input password with a predetermined password;
   means for enabling copying of the system identification data from said memory to said storing medium only when the input password coincides with the predetermined password.

19. A radio communication terminal for use in a radio communication system, said radio communication terminal comprising:
   a memory for storing first system identification data;
   receiving means for receiving a detachable storing medium which has stored therein second system identification data;
   means for selecting one of the first system identification data stored in said memory and the second system identification data stored in said detachable storing medium received by said receiving means; and
   means for directly communicating with another radio communication terminal in peer-to-peer mode by using one of the first and second system identification data selected by said selecting means.

20. The radio communication terminal according to claim 19, wherein said selecting means includes means for selecting the second system identification data stored in said storing medium when said receiving means receives said storing medium.

21. The radio communication terminal according to claim 19, further comprising means for inputting a command for controlling said selecting means to select one of the first and second system identification data.

22. A radio communication terminal for use in a radio communication system, said radio communication terminal comprising:
   a first memory;
   receiving means for receiving a first detachable storing medium which has stored therein first system identification data;
   means for writing the first system identification data stored in said first detachable storing medium to said first memory; and
   means for directly communicating with another radio communication terminal in peer-to-peer mode by using the first system identification data stored in said first memory when said first detachable storing medium is received by the other radio communication terminal.

23. The radio communication terminal according to claim 22, further comprising:
   a second memory for storing second system identification data;
   selecting means for selecting one of the second system identification data stored in said second memory and the first system identification data stored in said first memory; and
   means for directly communicating with the other radio communication terminal using the one of the first and second system identification data selected by said selecting means.

24. The radio communication terminal according to claim 22, further comprising:
   a second storing medium for storing second system identification data;
   selecting means for, when said receiving means receives said second storing medium, selecting one of the first system identification data stored in said first memory and the second system identification data stored in said second storing medium; and
   means for directly communicating with the other radio communication terminal using the one of the first and second system identification data selected by said selecting means.

25. A radio communication terminal having system identification data for use in directly communicating in a peer-to-peer mode with another radio communication terminal having the same system identification data, said radio communication terminal comprising:
   receiving means for receiving a detachable storing medium adapted to be detachably installed in said radio communication terminal;
   instruction means for outputting an instruction; and
   writing means for, upon receipt of the instruction from said instruction means, writing the system identification data on said detachable storing medium when said detachable storing medium is installed in said radio communication terminal.

26. The radio communication terminal according to claim 25, further comprising:
   inputting means for inputting a password;
   comparing means for comparing an input password with a predetermined password; and
   means for enabling said writing means to execute a writing operation only when the input password coincides with the predetermined password.

27. A radio communication terminal having original system identification data stored therein for use in directly communicating in peer-to-peer mode with another radio communication terminal, said radio communication terminal comprising;
   receiving means for receiving a detachable storing medium adapted to be detachably installed in said radio communication terminal, said detachable storing medium having stored therein second system identification data;

selecting means for, when said detachable storing medium having the second system identification data stored therein is installed in said radio communication terminal, selecting one of the original system identification data and the second system identification data stored on said detachable storing medium; and communication means for directly communicating with the other radio communication terminal in peer-to-peer mode using the one of the original and second system identification data selected by said selecting means.

28. The radio communication terminal according to claim 27, wherein said selecting means automatically selects said second system identification data stored in said storing medium when said storing medium is installed in said radio communication terminal.

29. The radio communication terminal according to claim 27, further comprising control means externally-operable by a user for controlling said selecting means to select one of the original system identification data and the second system identification data stored on said storing medium.

30. A radio communication terminal for directly communicating in peer-to-peer mode with another radio communication, said radio communication terminal comprising:

means for receiving a first detachable storing medium adapted to be detachably installed in said radio communication terminal, said first detachable storing medium having stored therein system identification data;

a first internal memory;

writing means for, when said first detachable storing medium is installed in said radio communication terminal, writing in said first internal memory the system identification data stored in said first detachable storing medium; and communication means for directly communicating with another radio communication terminal in peer-to-peer mode using the system identification data written in said internal memory by said writing means.

31. The radio communication terminal according to claim 30, further comprising:

a second internal memory for storing original system identification data; and selecting means for selecting one of the original system identification data stored in said second internal memory and the system identification data written in said first internal memory by said writing means;

wherein said communication means communicates with the other radio communication terminal using the one of the original system identification data stored in said second internal memory and the system identification data written in said first internal memory which is selected by said selecting means.

32. The radio communication terminal according to claim 30, further comprising:

means for receiving a second storing medium which has stored therein original system identification data; and selecting means for, when said second storing medium is installed in said radio communication terminal, selecting one of the original system identification data stored in said second storing medium and the system identification data written in said first internal memory by said writing means;

wherein said communication means communicates with the other radio communication terminal using the one of the original system identification data stored in said second storing medium and the system identification data written in said first internal memory which is selected by said selecting means.

33. A radio communication system comprising:

a first radio communication terminal comprising a first memory for storing first system identification data, means for copying the first system identification data stored in the first memory to a first detachable storing medium, and means for copying second system identification data stored in a second detachable storing medium to the first memory; and a second radio communication terminal comprising a second memory for storing the second system identification data, means for copying the second system identification data stored in the second memory to the second detachable storing medium, and means for copying the first system identification data stored in the first detachable storing medium to the second memory, wherein said first and second radio communication terminals directly communicate with each other in a peer-to-peer mode by using one of the first and second system identification data stored in the first memory and the second memory.

* * * * *